United States Patent
Balderrama et al.

(10) Patent No.: US 10,113,579 B2
(45) Date of Patent: Oct. 30, 2018

(54) HYBRID COMPOSITE-METAL BREAKAWAY NUT FASTENER

(71) Applicant: NMC GROUP, INC., Pomona, CA (US)

(72) Inventors: Mark Anthony Balderrama, Pomona, CA (US); James D. Karls, Pomona, CA (US)

(73) Assignee: NMC GROUP, INC., Pomona, CA (US)

( * ) Notice: Subject to any disclaimer, the term of this patent is extended or adjusted under 35 U.S.C. 154(b) by 14 days.

(21) Appl. No.: 15/130,069

(22) Filed: Apr. 15, 2016

(65) Prior Publication Data

US 2016/0305464 A1    Oct. 20, 2016

Related U.S. Application Data

(60) Provisional application No. 62/149,248, filed on Apr. 17, 2015.

(51) Int. Cl.
*F16B 31/00* (2006.01)
*F16B 31/02* (2006.01)

(52) U.S. Cl.
CPC ............ *F16B 31/021* (2013.01); *F16B 31/00* (2013.01)

(58) Field of Classification Search
CPC ........ F16B 31/00; F16B 31/021; F16B 31/04; F16B 37/122
USPC .......................... 411/1–5, 432, 433, 517, 917
See application file for complete search history.

(56) References Cited

U.S. PATENT DOCUMENTS

| | | | | |
|---|---|---|---|---|
| 2,394,812 A | * | 2/1946 | Seitz | F16B 39/286 411/5 |
| 3,198,231 A | * | 8/1965 | Bisbing | F16B 37/122 411/109 |
| 3,370,341 A | * | 2/1968 | Allsop | B65D 21/0219 29/413 |
| 3,444,775 A | | 5/1969 | Hills | |
| 3,512,447 A | | 5/1970 | Vaughn | |
| 3,742,583 A | * | 7/1973 | Devlin | F16B 31/021 29/413 |
| 4,518,295 A | | 5/1985 | Matuschek | |
| 4,784,549 A | | 11/1988 | Wing | |

(Continued)

FOREIGN PATENT DOCUMENTS

GB    1330320    10/1970

OTHER PUBLICATIONS

Copenheaver, Blaine R.; International PCT Search Report; dated Jul. 8, 2016.

*Primary Examiner* — Roberta S Delisle
(74) *Attorney, Agent, or Firm* — David Duckworth

(57) ABSTRACT

A breakaway nut fastener is provided having a hybrid construction of plastic and metal. The breakaway nut fastener includes a head portion and a nut portion connected by a thin walled section. The head portion is made of plastic and has a shape so as to mate to a tool. The nut portion has an exterior shell having a cavity for receiving a nut insert. The nut portion's exterior shell is made of plastic while the nut insert is made of metal. The breakaway nut fastener's thin walled section is also made of plastic joining the breakaway nut fastener's head portion and the nut portion's exterior shell. The thin walled section is made of plastic, and preferably the head portion, nut portion and thin walled section are constructed as one part forming a single component of plastic.

4 Claims, 2 Drawing Sheets

(56) References Cited

U.S. PATENT DOCUMENTS

| | | | |
|---|---|---|---|
| 4,836,727 A | 6/1989 | Volkmann | |
| 4,925,364 A | 5/1990 | Das | |
| 4,936,727 A * | 6/1990 | Kolvereid | F16B 39/126 411/237 |
| 4,941,788 A * | 7/1990 | Highfield | F16B 37/122 411/178 |
| 5,026,233 A | 6/1991 | Carothers | |
| 5,083,888 A | 1/1992 | Gapp et al. | |
| 5,399,052 A | 3/1995 | Volkmann et al. | |
| 6,406,240 B1 * | 6/2002 | Potter | F16B 37/0864 411/267 |
| 6,692,207 B1 * | 2/2004 | Bailey | F16B 37/122 411/180 |
| 7,441,997 B2 | 10/2008 | Ramasamy et al. | |
| 7,465,136 B2 * | 12/2008 | Nagayama | B21K 1/56 411/178 |
| 8,061,945 B2 * | 11/2011 | Smith | F16B 37/0842 411/267 |
| 8,662,805 B2 | 3/2014 | Schaeffer et al. | |
| 2003/0198528 A1 | 10/2003 | Onishi et al. | |
| 2004/0136801 A1 | 7/2004 | Schneider et al. | |
| 2006/0291974 A1 | 12/2006 | McGee et al. | |
| 2008/0014042 A1 * | 1/2008 | De France | F16B 23/0061 411/2 |
| 2008/0292425 A1 | 11/2008 | Pineiros et al. | |
| 2010/0296891 A1 | 11/2010 | Tsukamoto | |
| 2011/0113932 A1 | 5/2011 | Lambert et al. | |

\* cited by examiner

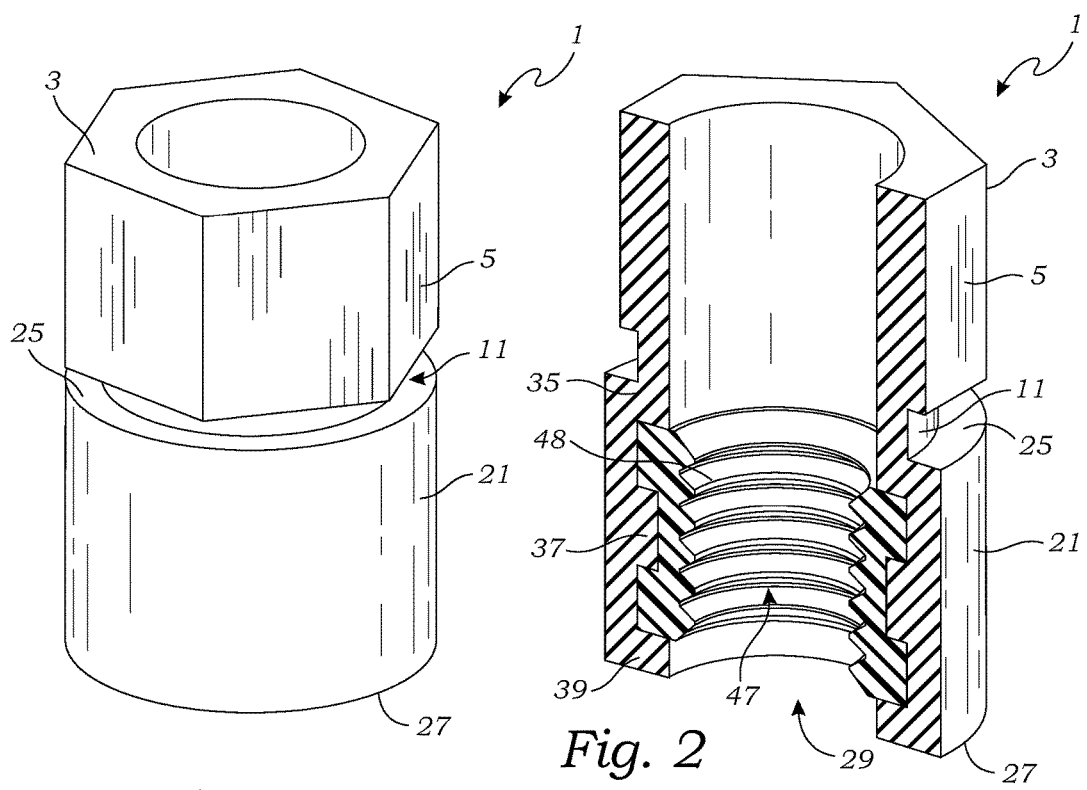
Fig. 1
Fig. 2
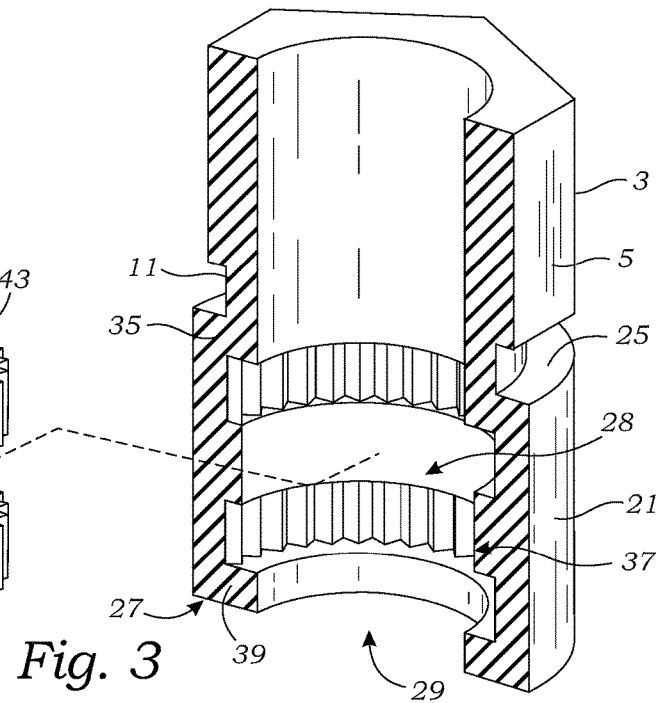
Fig. 3

HYBRID COMPOSITE-METAL BREAKAWAY NUT FASTENER

RELATED APPLICATIONS

The present application is a continuation of U.S. Provisional Patent Application Ser. No. 62/149,248 filed on Apr. 17, 2015.

BACKGROUND OF THE INVENTION

The present invention relates to fasteners. More particularly, the present invention relates to female threaded nuts having a head which can be frangibly removed.

It is vitally important for nut and bolt type fasteners to be torqued to a sufficient value to secure fastening. This is particularly important in the manufacturing of aircraft where lives are at stake. To affix structures together, a bolt is passed through holes formed to align in adjacent structures and a nut is threadably affixed to the bolt. Often, the nut is torqued using a power tool.

To assure that the nut is securely fastened to the bolt, but to avoid over-torqueing the nut, many power driven tools include a clutch mechanism so that the tool will slip so as to not rotate the nut after a predetermined torque has been reached. Unfortunately, power tools may not accurately determine the torque not to exceed or the power tool clutch may inadvertently fail. Consequently, nuts may be inadequately torqued or over-torqued so as to damage the structure or the fasteners.

These problems have been overcome in the past by the use of breakaway nuts wherein the fastener includes a driving head portion. The nut portion and head portion are connected by a thin walled section which is constructed to shear at a predetermined torque. The construction permits the head portion to automatically shear, in other words break off, when a predetermined torque is achieved by a tool, such as a power tool. Accordingly, breakaway nuts do not require that the power tool include a clutch mechanism. Moreover, the breakaway nut construction provides the ability to visually inspect the nut to determine whether it has been adequately torqued. Simply, if the head portion has not twisted off the nut, it is immediately evident that the nut has not been sufficiently torqued.

Unfortunately, previous breakaway nuts suffer from disadvantages. Specifically, breakaway nuts typically have an all-metal construction. The metal provides high strength, but metal fasteners are excessively heavy. Where weight is a premium, such as within aircraft construction, all-metal fasteners pose significant problems. Moreover, metal fasteners can be prone to corrosion including galvanic corrosion.

Attempts have been made to provide fasteners made of plastic or other composite materials so as to reduce weight or corrosion. Unfortunately, the reduction in weight has often caused a corresponding reduction in strength and the ability of the structure to withstand the various stresses to which the assembly may be subjected. For example, U.S. Pat. No. 5,083,888 describes a breakaway nut constructed of a carbon reinforced composite material. The carbon fibers extend perpendicular to the axis of the nut so as to enable the head portion to shear away. Though this structure is not susceptible to corrosion, the construction is relatively expensive to manufacture. Meanwhile, U.S. Pat. No. 8,662,805 describes a breakaway nut which attempts to overcome the problems of galvanic corrosion. The nut portion and head portion are made of metal, but the frangible neck portion is made of a metal that is different than that of the nut and has a higher resistance to corrosion than the base nut material. The frangible section is preferably made of stainless steel so as to provide greater corrosion resistance at the surface where the fastener shears. Unfortunately, this breakaway nut is an all-metal construction which does not provide any weight savings and is expensive to manufacture.

Thus, it would be advantageous to provide an improved frangible nut fastener which possesses high strength.

It would also be advantageous to provide an improved frangible nut fastener which was light weight, inexpensive to manufacture, and particularly acceptable for use within aircraft construction.

SUMMARY OF THE INVENTION

The present invention addresses the aforementioned disadvantages by providing a hybrid composite-metal breakaway nut fastener.

The breakaway nut fastener includes a head portion and a nut portion connected together by a thin walled section. For purposes of facilitating its description, the head portion is described herein as located at the proximal end of the breakaway nut fastener and the nut portion is described herein as located at the distal end of the breakaway nut fastener. The breakaway nut fastener has a central axis about which it is rotated for installation upon a male threaded fastener. The head portion includes its own proximal end and a distal end. Furthermore, it has a shape constructed so as to mate to a tool so as to facilitate the rotation of the breakaway nut fastener. The shape may include a female recess such as a hexagonal recess for mating to an Allen wrench. More preferably, the head portion has a hexagonal exterior for mating to a traditional socket tool having a hexagonal cavity. Preferably, but not necessarily, the head portion has a central bore. Also preferably, the head portion is made of plastic such as polyetheretherketone (PEEK).

The breakaway nut fastener's nut portion includes an exterior shell made of plastic, preferably polyetheretherketone (PEEK). In addition, the nut portion includes a nut insert. The nut portion's exterior shell has an annular shape having a proximal end, a distal end, a central cavity, and an exterior circumferential surface. Meanwhile, the nut insert is made of metal, such as steel, aluminum or titanium. The nut insert has the traditional shape of a nut fastener having an annular shape, proximal and distal ends, a circumferential exterior surface and a female threaded bore coaxial to the breakaway nut fastener's central axis. The nut portion's insert is affixed coaxially within the nut portion's exterior shell so that rotation of the exterior shell about the nut fastener's central axis will cause the nut insert to rotate as well.

The breakaway nut fastener's thin walled section connects and affixes the head portion's distal end to the nut portion's exterior shell's proximal end. To this end, preferably the thin walled section has an annular shape which has a wall thickness thinner than the nut portion's exterior shell at its proximal end and the thin wall section has a wall thickness thinner than the head portion which may or may not be annular in shape. The thin walled section is made of plastic preferably of the same type as the head portion and nut portion's exterior shell. Preferably, the head portion, exterior shell and thin walled section are a one piece construction made of plastic. For purposes herein, "one piece construction" is interpreted to mean that these components are constructed as a single part made of a homogenous plastic material such as through traditional plastic molding techniques such as injection molding, blow molding, compression molding or 3D printing, though other plastic molding techniques may be employed.

Preferably, the metal nut insert is positioned within the nut portion's plastic exterior shell so that there is an axial space between the nut insert's proximal and distal ends and the exterior shell's proximal and distal ends. This axial space at each end of the nut portion provides the exterior shell with protective sections that at least partially cover the proximal and distal ends of the nut insert. Advantageously, the distally located protective section prevents the nut insert from engaging an underlying substrate even after the nut portion has been affixed to a male threaded fastener so as to prevent galvanic corrosion of the nut insert. Moreover, the proximally located protective section at least partially covers the proximal end of the nut insert to protect it from environmental factors. In a preferred embodiment, the proximal protective section completely covers and protects the proximal end of the nut insert even after the head portion has sheared away from the nut portion. To this end, the proximal protective section may be circular so as to completely cover the nut insert and bolt. Alternatively, the proximal protective section may be annularly shaped having a center hole sufficiently small, or threaded, to receive and engage the bolt and/or bolt threads.

Thus the present invention provides a hybrid composite-metal breakaway nut fastener that provides substantial strength, but improved weight savings.

In still an additional advantage of the present invention is that the hybrid composite metal breakaway nut fastener prevents corrosion, unwanted electrical conduction while maintaining high strength. Still additional advantages of the present invention would be appreciated by those skilled in the art upon reading the detailed description which follows with reference to the attached drawings.

BRIEF DESCRIPTION OF THE DRAWINGS

FIG. 1 is a perspective view of the breakaway nut fastener of the present invention;

FIG. 2 is a cross-sectional view of the breakaway nut fastener of the present invention;

FIG. 3 is an exploded and cross-sectional view of the breakaway nut fastener of the present invention;

DETAILED DESCRIPTION OF THE INVENTION

Figure 6:
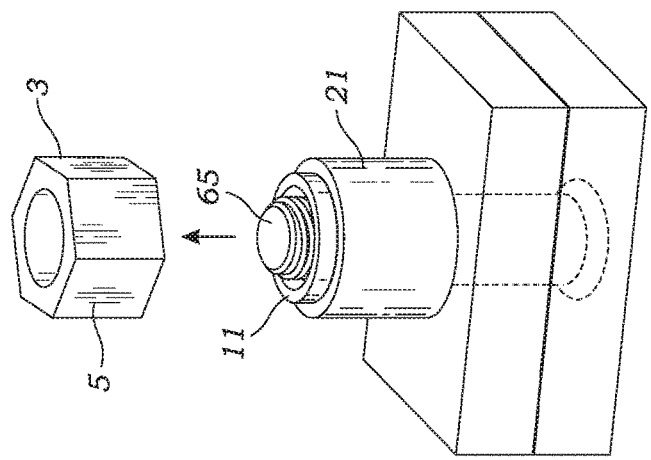
FIG. 6 is a perspective view illustrating the breakaway nut fastener of the present invention as the head portion disengages from the nut portion.

While the present invention is susceptible of embodiment in various forms, as shown in the drawings, hereinafter will be described the presently preferred embodiments of the invention with the understanding that the present disclosure is to be considered as an exemplification of the invention, and the present disclosure is not intended to limit the invention to specific embodiments illustrated.

With reference to FIGS. 1-6, the breakaway nut fastener 1 includes a head portion 3 connected to a nut portion 21 by a thin walled section 11. Preferably, the thin walled section has a thinner cross-section or wall thickness than the adjacent head portion 3 and nut portion 21 as the thin walled section 11 is intended to be frangible and to shear to allow the breakaway nut fastener's head portion 3 to disengage from the nut portion 21 when predetermined torque is applied to the head portion, as illustrated in FIG. 6. Advantageously, the thickness of the thin walled section 11 is selected with consideration of the tensile strength of the thin walled section's plastic material so that the thin walled section 11 will shear at a predetermined torque value.

With reference particularly to FIGS. 2 and 3, the fastener's nut portion 21 is constructed of two parts including an exterior shell 23 made of plastic and a nut insert 41 made of metal. The nut insert 41 may be made of various metals as can be determined by those skilled in the art. However, a 300 series stainless steel is considered preferred. Meanwhile, the nut portion's shell 23 may be made of various plastics as can be selected by those skilled in the art. A preferred plastic is polyetheretherketone (PEEK).

Figure 4:
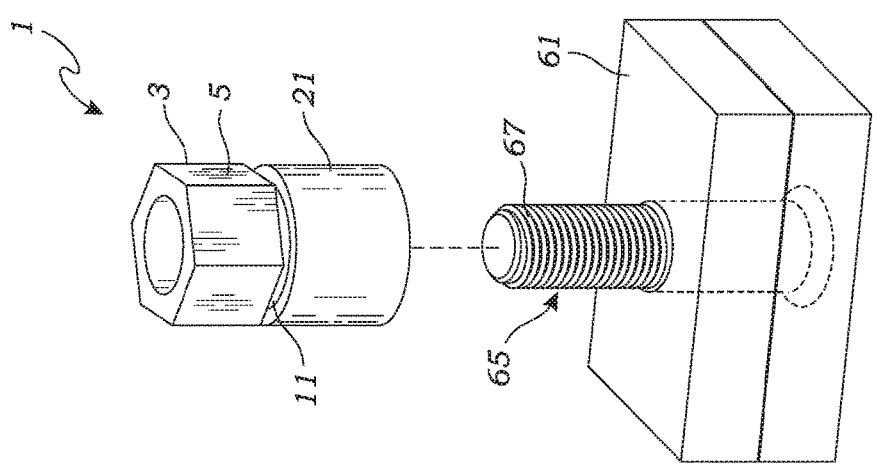
FIG. 4 is a perspective view illustrating a breakaway nut fastener of the present invention to be mated to a bolt holding two structures together.

The nut portion's plastic shell 23 includes a top proximal end 25, a bottom distal end 27 and a central cavity 28. Preferably, the shell 23 is substantially cylindrical, and the shell's central cavity 28 is concentrically positioned within the shell's cylindrical structure. As illustrated in FIGS. 2 and 3, the central cavity 28 has an inlet 29. As illustrated in the figures, the inlet 29 does not need to be threaded. However, in alternative embodiments not shown, the inlet 29 may be threaded so as to threadably receive the male threads of a bolt such as illustrated in FIG. 4.

Figure 5:
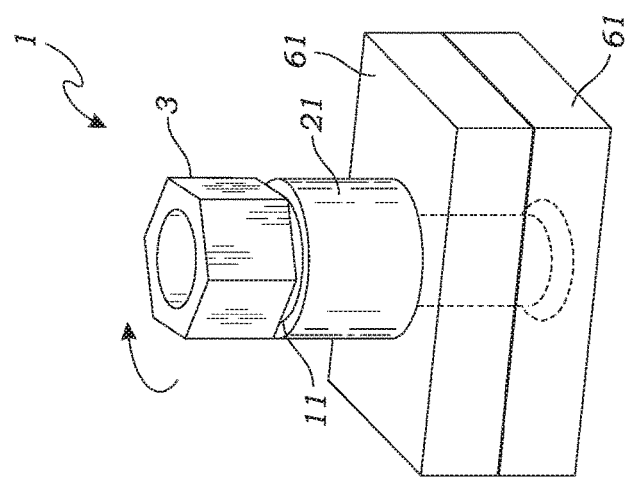
FIG. 5 is a perspective view illustrating a breakaway nut fastener as applied to the bolt shown in FIG. 4.

With reference to FIGS. 2 and 3, the shell's central cavity 28 is configured to receive the nut portion's metal nut insert 41. The metal nut insert 41 includes a top proximal end 43, a bottom distal end 45 and a central bore 47 which is female threaded for receipt of the male threads 67 of a male fastener 65 as illustrated in FIGS. 4-6. The metal nut insert's threads 48 are concentrically aligned with the plastic shell's central cavity 28 for receiving the threads 67 of a male fastener 65 as introduced into the shell's inlet 29. The metal nut insert's threads 48 may or may not be constructed as "locking" threads as can be selected by those skilled in the art. However, if constructed as locking threads, it is preferred that the female threads be constructed to comply with aircraft industry specification NSAM 25027 which is incorporated by reference herein.

Still with reference to FIGS. 2 and 3, it is preferred that the metal nut insert 41 includes an annular recess 49 for receiving a center circular section 37 of the plastic shell 23. Furthermore, it is preferred that the metal nut insert 41 include serrations, notches, or projections 43 which project radially from the nut insert's cylindrical exterior to project into corresponding recesses formed within the nut portion's shell. These serrations, notches, and/or projections 53 affix the metal nut insert 41 within the nut portion's plastic shell 23 so as to prevent the metal nut insert 41 from rotating relative to the nut portion's plastic shell 23. Other structures for affixing the metal nut insert 41 within the plastic shell 23 may be employed by those skilled in the art. For example, the metal nut insert 41 may be constructed as a traditional hexagonal nut. However, it is preferred that the metal nut insert be substantially cylindrical so as to provide the greatest weight savings and to reduce areas prone to mechanical failure.

Preferably the metal nut insert 41 is positioned within the nut portion's plastic shell 23 so that there is a space between the metal nut insert's proximal end 43 and the plastic shell's proximal end 25 so as to create a top/proximal protective section 35. Similarly, preferably the metal nut insert 41 is sized and positioned within the plastic shell 23 so that there is a space between the metal nut insert's distal end 45 and the plastic shell's distal end 27 so as to create a bottom/distal protective section 39. These top and bottom protective sections are provided to at least partially cover the proximal 43 and distal 45 surfaces of the metal nut insert so as to protect against corrosion and particularly galvanic corrosion of the metal nut insert 41 even after the nut portion 21 has been affixed to a bolt 65 as illustrated in FIG. 6, and the head portion 3 has disengaged.

As illustrated in FIGS. 2 and 3, the breakaway nut fastener's head portion 3 and thin walled section 11 are preferably plastic and formed integrally with the nut portion's shell 23 so as to create a homogeneous single component. The fastener's head portion 3 is constructed to mate to a tool so as to enable one to rotate the breakaway nut fastener for application to a bolt 65 or the like. (See FIGS. 4-6). To this end, the head portion 3 may be any of numerous shapes as can be selected by those skilled in the art. For example, the head may be hexagonal so as to include six sides 5 as illustrated in the figures. Alternatively, the head may be cylindrical, but include a recess for acceptance of a tool (not shown).

As illustrated in FIG. 4, the breakaway nut fastener 1 is affixed to a male threaded fastener 65 and an underlying substrate 61 by inserting the male threaded fastener 65 into the nut portion's female threaded bore 47. Torque is applied to the head portion 3 by a tool (not shown) to rotate the entire breakaway nut fastener until the nut portion 3 engages the underlying substrate 61 (FIG. 5). Thereafter, still additional torque is applied to the head portion 3. Once a predetermined torque is applied to the head portion, the thin walled section 11 will shear. This shearing of the thin walled section 11 results in the head portion 3 disengaging from the underlying nut portion 21, as illustrated in FIG. 6, resulting in the nut portion 21 affixed to the substrate 61.

While several particular forms of the invention have been illustrated and described, it will be apparent that various modifications can be made without departing from the spirit and scope of the invention. Accordingly, it is not intended that the invention be limited except by the following claim.

Having described my invention in such terms as to enable persons skilled in the art to understand the invention, recreate the invention and practice it, and having identified the presently preferred embodiments thereof, We claim:

1. A hybrid composite-metal breakaway nut fastener comprising:
    a head portion having a proximal end and a distal end defining a central axis, said head portion made of plastic and having a shape so as to mate to a tool so as to be rotated;
    a nut portion including an exterior shell and a nut insert, said exterior shell made of plastic and having an annular shape so as to include a proximal end and a distal inlet coaxial to said central axis, said nut insert made of metal, having a circumferential exterior surface, proximal and distal ends, and a female threaded bore, said nut insert being concentrically affixed within said exterior shell so as to be able to receive a male threaded fastener through said distal inlet of said exterior shell into said female threaded bore of said nut insert; and
    a thin walled section connecting and affixing said distal end of said head portion to said proximal end of said exterior shell; and
    wherein said head portion, thin walled section, and exterior shell of said nut portion are a one piece construction of plastic.

2. The hybrid composite-metal breakaway nut fastener of claim 1 wherein said proximal and distal ends of said nut insert are inwardly spaced away from the ends of said exterior shell to provide each of the ends of said exterior shell with a protective section which at least partially cover the proximal and distal ends of said nut insert.

3. The hybrid composite-metal breakaway nut fastener of claim 1 wherein said nut insert has a circumferential surface having serrations, notches, or projections which engage the interior surface of said annularly shaped exterior shell so as to inhibit relative rotation between said nut insert and said exterior shell.

4. The hybrid composite-metal breakaway nut fastener of claim 1 wherein said nut insert has an annular recess projecting into the circumferential surface of said nut insert, said annular recess coaxial to said central axis and positioned between said nut insert's proximal and distal ends.

\* \* \* \* \*